US005742675A

United States Patent [19]
Kilander et al.

[11] Patent Number: 5,742,675
[45] Date of Patent: Apr. 21, 1998

[54] METHOD AND APPARATUS FOR AUTOMATICALLY DISTRIBUTING CALLS TO AVAILABLE LOGGED-IN CALL HANDLING AGENTS

[75] Inventors: Sven G.J. Kilander, Flen, Sweden; Christopher G. Sheahan, Victoria, Australia

[73] Assignee: Telefonaktiebolaget LM Ericsson, Stockholm, Sweden

[21] Appl. No.: 534,199

[22] Filed: Sep. 26, 1995

[51] Int. Cl.$^6$ ................................................. H04M 3/00
[52] U.S. Cl. ........................ 379/265; 379/266; 379/309
[58] Field of Search .................................. 379/265, 266, 379/207, 210, 211, 309, 212, 201, 67

[56] References Cited

U.S. PATENT DOCUMENTS

| | | | |
|---|---|---|---|
| 5,036,535 | 7/1991 | Gechter et al. | 379/210 |
| 5,097,528 | 3/1992 | Gursahaney et al. | 379/67 |
| 5,185,782 | 2/1993 | Srinvisan | 379/67 |
| 5,206,903 | 4/1993 | Kohler et al. | 379/309 |
| 5,291,551 | 3/1994 | Conn et al. | 379/265 |
| 5,299,260 | 3/1994 | Shaio | 379/210 |
| 5,309,505 | 5/1994 | Szlam et al. | 379/265 |
| 5,309,513 | 5/1994 | Rose | 379/265 |
| 5,315,647 | 5/1994 | Araujo | 379/265 |
| 5,329,578 | 7/1994 | Brennan et al. | 379/265 |
| 5,392,345 | 2/1995 | Otto | 379/265 |
| 5,459,780 | 10/1995 | Sand | 379/210 |
| 5,519,772 | 5/1996 | Akman et al. | 379/266 |
| 5,530,931 | 6/1996 | Cook-Hellberg et al. | 379/210 |
| 5,590,186 | 12/1996 | Liao et al. | 379/201 |
| 5,590,187 | 12/1996 | Greenspan | 379/201 |
| 5,617,471 | 4/1997 | Rogers et al. | 379/212 |
| 5,619,557 | 4/1997 | Van Berkum | 379/201 |

FOREIGN PATENT DOCUMENTS

| | | |
|---|---|---|
| 0 376 527 | 7/1990 | European Pat. Off. . |
| 0 429 770 | 6/1991 | European Pat. Off. . |
| 0 501 189 | 9/1992 | European Pat. Off. . |
| 0545226A2 | 11/1992 | European Pat. Off. . |
| 0568770A2 | 2/1993 | European Pat. Off. . |
| 0 539 104 | 4/1993 | European Pat. Off. . |
| 0622938A2 | 4/1994 | European Pat. Off. . |
| 0 604 041 | 6/1994 | European Pat. Off. . |
| 0 647 051 | 4/1995 | European Pat. Off. . |
| 2270234A | 6/1993 | United Kingdom . |
| 92 09164 | 5/1992 | WIPO . |
| WO 94/00945 | 1/1994 | WIPO . |

*Primary Examiner*—Krista Zele
*Assistant Examiner*—Scott Wolinsky
*Attorney, Agent, or Firm*—Nixon & Vanderhye P.C.

[57] ABSTRACT

An automatic call distribution system includes plural call receiving agents associated with a service entity, each of which has conventional telephone access to the public switched telephone network (PSTN). A call center controller initially receives a caller communication from the PSTN intended for the service entity and selects one of the call receiving agents to handle the caller communication based on agent availability. The call center controller coordinates the establishment of a direct communications path for that call between the PSTN and the selected agent which is independent of the call center controller. In other words, after setting up the direct call connection, the call center controller is not an intermediary to or otherwise involved in the actual communication between the caller and the agent. Significantly, the call center controller establishes the direct call connection between the incoming call and a selected available call handling agent without the need for a separate private branch exchange (PBX) or automatic call distribution (ACD) switch.

16 Claims, 4 Drawing Sheets

METHOD AND APPARATUS FOR AUTOMATICALLY DISTRIBUTING CALLS TO AVAILABLE LOGGED-IN CALL HANDLING AGENTS

FIELD OF THE INVENTION

The invention is related to an automatic call distribution center, and in particular, to a method and apparatus for distributing calls to a plurality of call handling agents via the public switched telephone network (PSTN).

BACKGROUND OF THE INVENTION

Automatic call distribution (ACD) systems are used by service and marketing companies to provide, for example, telemarketing type services. In automatic call distribution systems, incoming calls concerning some product or service are distributed for handling to one of a plurality of call handling agents. Outgoing calls regarding the product or service may also be placed either manually by one of the agents or automatically by the ACD system itself. Each call handling agent typically has a telephone and a computer terminal at his/her workstation. Some agents sit together at a common, centralized office location, and others may work at remote locations such as satellite offices or their homes.

Because incoming callers or clients typically dial only one phone number to contact the service or marketing company, a call distribution mechanism is needed to distribute incoming calls to available call handling agents. To date an efficient, cost-effective mechanism has not yet been provided that distributes incoming calls to the single phone number to an available agent located either at a central location or at a remote location.

Call distribution functions are performed conventionally as a part of a private branch exchange (PBX) telephone switch or by a separate automatic call distribution (ACD) switch, see for example EPA 0622938A2. Many companies do not have, do not need, and/or cannot afford a separate, dedicated PBX or ACD switch. Nevertheless, if businesses need or desire automatic call distribution at any scale (large or small), they must purchase their own ACD and/or PBX switch. Another drawback of centrally-located, dedicated PBX or ACD switches is that they do not allow call handling agents to work at separate locations (including their homes) remote from the central business location.

What is needed is an automatic call distribution system which distributes calls to centrally and remotely located agents without a PBX or ACD switch.

SUMMARY OF THE INVENTION

It is an object of the present invention to provide an automatic call distribution system and method which eliminate the need for a PBX or an ACD switch in the selection of an agent to handle an incoming call.

It is a further object of the present invention to provide a call distribution controller which establishes a direct call connection between an incoming client call from the PSTN and a selected available call handling agent.

It is a further object to provide a call distribution controller which routes calls from the PSTN to centrally and remotely located call handling agents by setting up direct telephone connections with the public switched telephone network.

It is a further object of the invention in one embodiment of the present invention to maintain a direct connection between the PSTN and a selected call handling agent without any intervening or intermediate control by the call distribution controller.

It is a further object of the present invention to permit a call handling agent to indicate his availability to handle additional incoming calls from the agent's computer terminal rather than from a status of the agent's telephone.

In the automatic call distribution system according to the present invention, plural call receiving agents associated with a service entity have conventional telephone access to the public switched telephone network (PSTN). A call center controller initially receives a caller communication from the PSTN intended for the service entity and selects one of the call receiving agents to handle the caller communication based on agent availability. The call center controller coordinates the establishment of a direct communications path for the caller communication between the public telephone network and the selected agent that is independent of the call center controller. In other words, after setting up the direct call connection, the call center controller is not an intermediary to or otherwise involved in the substantive communication between the caller and the agent.

Each call handling agent has a telephone connected in conventional fashion to the PSTN and a computer terminal connected to the call center controller via datalink. The agent telephone and computer terminal are referred to collectively as the agent's "workstation." The call center controller selects an agent based on agent availability as sensed from agent inputs at each agent's computer terminal. Rather than a call being directed to an agent as soon as that agent hangs up the telephone, the controller waits for an affirmative indication of availability from the agent via the agent's computer terminal over the datalink. This technique of determining agent availability allows the agent to perform post telephone call data entry and processing tasks before having to handle a new call. Centrally located agent computer terminals may be connected over a local area network (LAN). One or more remotely located agents, e.g., located at their respective personal residences, may be connected by wide area network (WAN) to the call center controller and also to the local area network.

The call center controller includes a public telephone switch interface, a central processor, and a database that stores information including each agents' telephone number (either at a central office station or at a remote location) and their data processing terminal addresses on the LAN and/or WAN. The controller performs (1) call management functions that enable the client caller to be connected to an available call handling agent within a reasonable time after an initial caller greeting and initial caller information gathering, and (2) management information service functions to collect and "package" important real time and summary information for managing the business/service including average caller waiting time, call handling time, current caller queue status, etc. The call center controller is connected to, but physically separate from, a public telephone network switch (e.g., the AXE-10 switch available from Ericsson) using standard line interfaces without requiring any modification to the public telephone switch itself.

In operation, when a call to the business/service's telephone number is received by the PSTN switch, it is routed to the call center controller along with address information attached to that call, e.g., the callee identity, and in some telephone switches, the caller identity. The call center controller greets the caller using prerecorded voice messages and then queues the call until an agent becomes available. To direct the call to a local or remote agent, the call center controller (having found a free agent) makes an inquiry call via the PSTN switch to that selected agent. When the selected agent answers the call (i.e., to reconfirm that the agent is still available), the call center controller requests a call transfer from the PSTN switch to the selected agent's telephone number. The PSTN switch performs the call transfer directly connecting the PSTN to the selected agent with the call center controller no longer being involved in the communication or call connection. Accordingly, the present invention eliminates the need for a separate PBX or ACD switch.

The call center controller may be shared by many different business entities, each of which employs several call processing agents. In other words, the call center controller detects which calls are for which businesses and routes different business calls to available agents associated with the proper business. Since centrally and remotely located agents are already connected to the PSTN, there is no need for a special PBX or ACD switch. Thus, based on information in a single database, any number of calls can be directed to appropriate and available agents.

The call center controller includes an automated voice response capability which provides a voice greeting to the caller when the incoming call is first received at the call center server and provides continued interactive-type voice support to the caller if the call must be queued before an agent becomes available to take the call directly. Various call attendant functions can be supported during this time where the caller provides different kinds of information relevant to the business/service using for example push button DTMF responses to pre-recorded questions. This information is then recorded at the call center database and later presented to the selected agent's computer terminal for display.

Once an agent becomes available, the call is transferred as described above. When an agent is directly handling the call, the present invention permits that agent to transfer the caller to another (expert) agent. Along with the call transfer, a copy of the data pertaining to this caller is transferred via the data network (e.g., LAN and/or WAN) linking the various agent computer terminals.

These and other advantages and features of the invention will become apparent from the following description of and illustrated in the embodiment of the invention taken together with the drawings.

DETAILED DESCRIPTION OF THE DRAWINGS

In the following description, for purposes of explanation and not limitation, specific details are set forth such as a particular telephone switch, interface, techniques, etc., in order to provide a thorough understanding of the present invention. However, it will be apparent to one skilled in the art that the present invention may be practiced in other embodiments that depart from the specific details. In other instances, detailed descriptions of well known methods, devices, and circuits are omitted so as not to obscure the description of the present invention with unnecessary detail.

Figure 1:
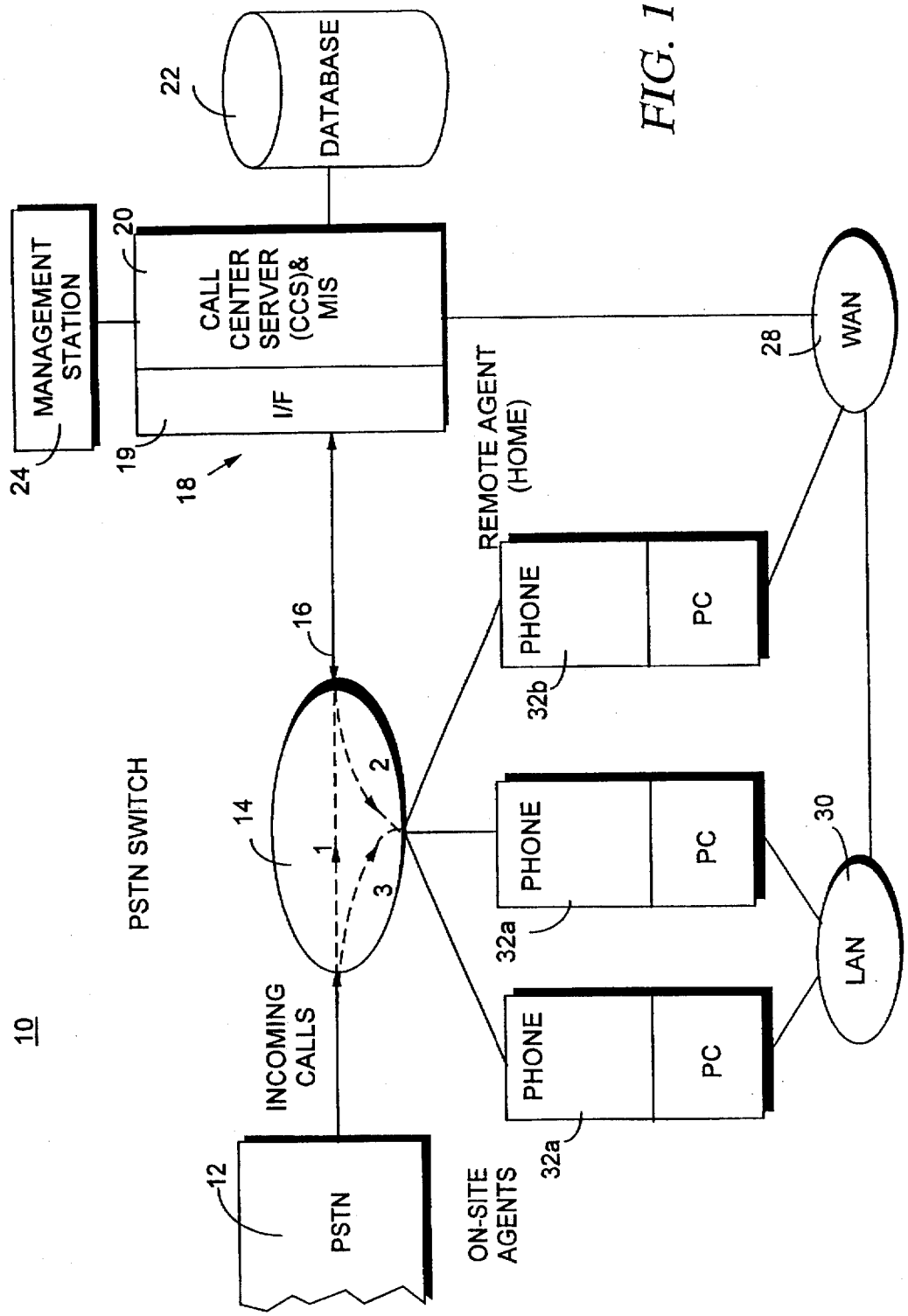
FIG. 1 is a function block diagram illustrating the automatic call distribution system in accordance with the present invention.

Referring to FIG. 1, an overall block diagram of the automatic call distribution system 10 according to the present invention is shown. The public switched telephone network (PSTN) 12 routes calls to a PSTN switch 14 which is connected to a call center controller 18 and a plurality of call handling agent workstations 32a and 32b. One example PSTN switch is the Ericsson AXE-10 telephone switch. Plural call handling agent workstations 32a are located "on-site" at a central business/service facility requiring automatic call distribution. Naturally, there may be more than two such on-site call handling agents. One or more remote agent workstations 32b are located at facilities separate from the main on-site business facility and may be located for example at satellite business offices or homes of call handling agents. Each call handling agent's call handling workstation includes a computer terminal (e.g., a personal computer) and a telephone connected by conventional telephone wires to the PSTN 12 via the PSTN switch 14. The agent workstation may also be a so-called "intelligent workstation" which receives and transmits voice signals as well data messages using a single terminal unit.

The on-site call handling agent workstation computer terminals may be connected over a suitable data communications link 26 to the call center controller 18. The on-site terminals may preferably be connected together by a local area network (LAN) 30 and to remote terminals via wide area network (WAN) 28. As shown in FIG. 1, the remotely located call handling agent workstation 32b is connected to WAN 28. While each of the agent computer terminals need not be connected by LAN 30 and/or WAN 28, these network and interwork connections provide additional data communication features which a business may find desirable in servicing its customers, namely the ability to exchange important data information between the computer terminals of the various call handling agents. Nevertheless, to implement the present invention, it is only necessary to have some kind of data link communication between the call center controller and the computer of each call handling agent workstation.

The call center controller 18 includes a PSTN switch interface 19 which is connected by suitable data and voice communication lines 16 to the PSTN switch 14, a call center server (CCS) 20, a database 22, and an optional management station 24. The call center server 20 includes suitable data processing and memory hardware for storing/processing data and program instructions as well as generating prerecorded voice messages all of which are used to perform a number of functions in accordance with the present invention as described further below. Broadly speaking, the call center server 20 performs (1) call management functions including automatic attendant and greeting services to incoming calls, call queuing, call agent handling monitoring and selection, and (2) management information service (MIS) functions to collect and "package" important real time and summary information for managing the business/service including call handling time, current caller queue status, average caller waiting time, call handling agent productivity, etc. Management information can be provided to an optional management station 24, which may be for example, a personal computer connected by suitable data link, to provide management personnel with important up-to-date business/productivity information.

The call center controller 18 includes a single database 22 (or alternatively a plurality of databases) for storing (1) information regarding each business entity which is being serviced, (2) addressing and identification information (telephone number, computer terminal address on network, etc.) for each agent for each serviced business entity, and (3) call-related information for each such call handling agent.

Of course, the database also stores identification and other sales information for each serviced customer. An advantageous feature of the present invention is that the call center controller 18 can perform call handling and other functions for multiple business/service entity rather than just a single business/service entity. In the database 22, the call center server 20 stores the business telephone number for each business for which the call center controller 18 performs automatic call handling functions along with a table of agents potentially available to service incoming calls for each of these business numbers. For each call handling agent, information regarding that agent's log-on status, current availability status (if logged on), telephone number, and data communications address. By analyzing each incoming call and referring to appropriate information in database 22, the call center controller 18 provides the above-described functions for the appropriate business.

In operation, when a call to one of the business/service telephone numbers handled by the call center controller 18 is received by the PSTN switch 14, it is routed to the call center server 20 via interface 19 along with address/identity information associated with the call including the caller's identity and callee identity including business/service's telephone number. In response to incoming calls, the call center server 20 identifies the particular callee/business identity and greets the caller with a voice message or greeting appropriately pre-recorded for that business entity. If no call handling agents are immediately available, the call is queued and the caller is queried for relevant information using automatic call attendant functions. For example, the caller may be audibly prompted to provide different kinds of information relevant to the business/service to be provided using pushbutton DTMF responses. Such automated greeting and attendant functions are useful in both immediately servicing/responding to the caller as well as gathering caller information. That gathered caller information is then stored in database 22 and routed over the data link 26 to the call handling agent selected to handle the incoming call. As a result, at the same time the selected call handling agent begins speaking with the caller on the telephone, the agent also can "pull up" information about that caller obtained from database 22 and/or by the automatic call attendant interaction with the caller.

Once an agent indicates his availability over the datalink 26 to the call center server 20, the call center server 20 removes the call from the queue and initiates a call transfer operation via the PSTN switch 14. PSTN switches such as the Ericsson AXE-10 readily support call transfer type functions, and in response to a call transfer request, route an inquiry call from the call center server 20 to the selected agent's telephone. If the agent answers his/her telephone, the PSTN switch 14 then routes the incoming call directly to that agent's telephone and disconnects the telephone connection between the call center server 20 and the incoming caller. The caller and agent then communicate over a direct telephone line connection via the PSTN 12 and PSTN switch 14.

The present invention also permits a selected call handling agent to later transfer the call to another call handling agent. This interagent call transfer may be desirable or otherwise necessary where a specialized or expert call handling agent is needed to provide the service requested by the caller. A call transfer between agents can be effected using the same call transfer procedure through the PSTN switch 14 as described above in conjunction with the call center server 20. Moreover, a copy of the data accumulated for this particular caller is transferred to the expert/specialist agent via the datalink 26 (e.g., the LAN 30 or WAN 28) which link the various workstation computers.

In this way, calls can be handled and efficiently distributed to various call handling agents for a plurality of businesses without the need for a special automatic call distribution or private branch exchange switch. Moreover, calls can be distributed efficiently to on-site call handling agents as well as remotely located call handling agents and effectively serviced and coordinated using a common datalink or network.

Figure 2:
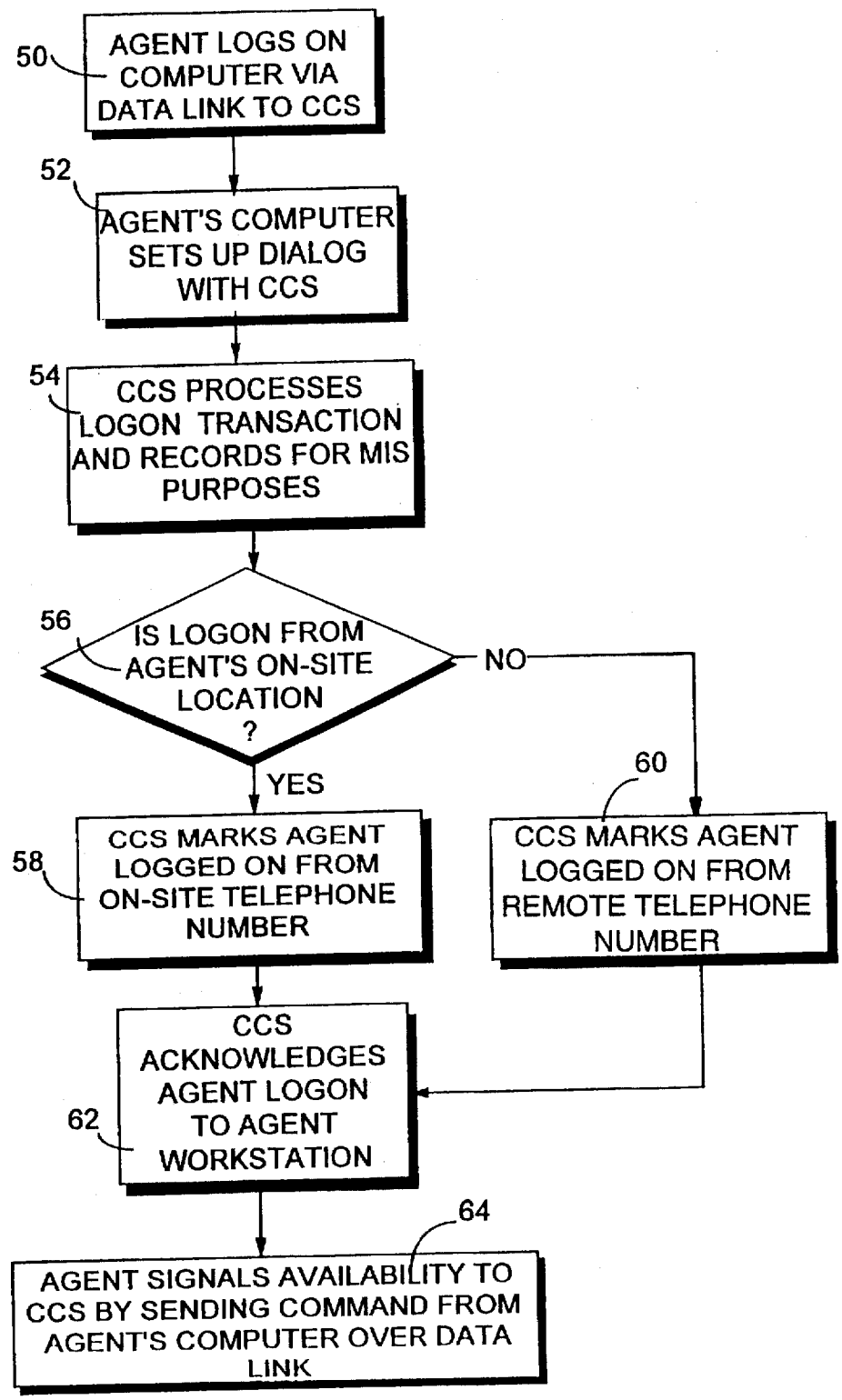
FIGS. 2-5 are various flowchart diagrams illustrating various methods for performing the present invention.

A more detailed description of an example method of implementing the present invention is now provided in conjunction with the flowchart diagrams illustrated in FIGS. 2–5. FIG. 2 outlines an initialization procedure. A call handling agent logs on to his/her computer terminal at his/her workstation and the log-on communicated via datalink 26 to the call center server 20 (block 50). The agent's logged-on computer then sets up an on-going dialog with the CCS 20 (block 52), and records the log-on for management information purposes (block 54). The CCS 20 processes the log-on transaction, and decision is made (block 56) whether the log-on is from the call handling agent's on-site working location. If so, the CCS 20 marks the agent as being logged-on from a corresponding, on-site telephone number and computer terminal address (block 58). Otherwise, the log-in is marked by the CCS 20 as being from an off-site telephone number and computer terminal address such as from the call handling agent's personal residence (block 60). The CCS 20 acknowledges a valid log-on to the agent workstation (block 62). When the call handling agent is prepared to take a new call, the agent signals his/her availability to the CCS 20 by entering a command on the agent's computer and sending it over datalink 26 to the CCS 20 (block 64).

Figure 3:
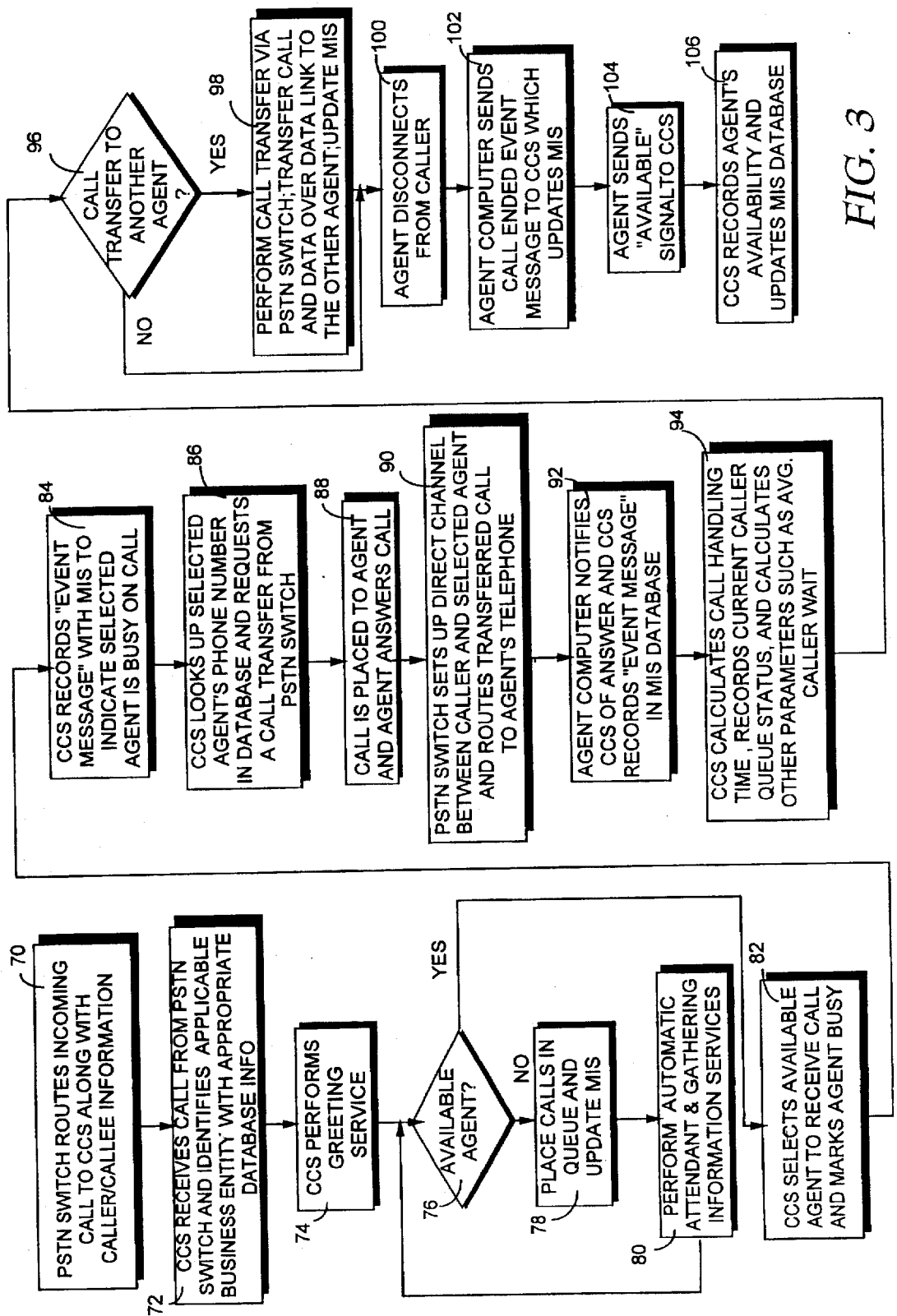

FIG. 3 is a flowchart diagram illustrating example processing of a call routing procedure in accordance with the present invention. In block 70, the PSTN switch 14 routes the incoming call to the call center controller 18 along with caller/callee identity information. The CCS 20 receives the call from the PSTN switch 14 and identifies from the callee identification information the applicable business entity along with the appropriate database information pertinent to that business entity (block 72). The CCS 20 then performs an initial automated greeting (using pre-recorded messages) in block 74 and determines whether a call handling agent is available to immediately handle the call in decision block 76. If not, the call is immediately placed in a call queue, and the CCS 20 updates the management information service (MIS) section of database 22 to record the incoming call and its queued status (block 78). While the call is queued, the CCS 20 performs automatic attendant and information gathering services as described above (block 80).

Once a call handling agent is determined to be available, the CCS 20 selects the available agent to receive and handle the call and marks that agent as busy in database 22 (block 82). The CCS 20 then records an event message for the MIS to indicate that the selected agent is busy on the current call (block 84). The CCS 20 looks up the selected agent's telephone number in database 22 and requests a call transfer operation from the PSTN switch 14 (block 86). A telephone call is placed to the agent via the PSTN switch 14, and the agent (assuming he/she is still available) answers the call (block 88). The PSTN switch 14 sets up a direct communications channel connection between the caller and the selected agent's workstation and routes the transferred call to that selected agent's telephone (block 90). The agent's computer notifies the CCS 20 that the agent has answered, and the CCS 20 records that event message for MIS purposes (block 92). The CCS 20 calculates various management parameters relevant to the business including for example, call handling time, and parameters such as average caller waiting time period. The CCS 20 also performs database updating for the current caller and call transaction (block 94).

A decision is made in block 96 whether the current agent desires to transfer the call to another agent (such as a specialist or expert agent). If so, the agent performs a call transfer operation using the PSTN switch 14 in the same manner earlier performed by the CCS 20 (block 98). The call is transferred to the other agent, and the relevant caller data is transferred over the datalink 26 to the other agent. The call transfer is also recorded in the MIS database section.

After these functions are performed and in the situation where the call is not transferred to another agent, control proceeds to block 100 where the selected agent disconnects from the caller at the completion of the call. The agent's computer terminal then sends a call-ended event message to the CCS 20 for recording in the MIS section of the database 22 (block 102). Once the agent completes any post-call processing activities, he/she indicates his/her availability to the CCS 20 over the datalink 26 by entering on his/her computer terminal and sending over the datalink an appropriate availability command (block 104). The CCS 20 records the agent's availability and updates the appropriate MIS database entries (block 106).

Figure 4:
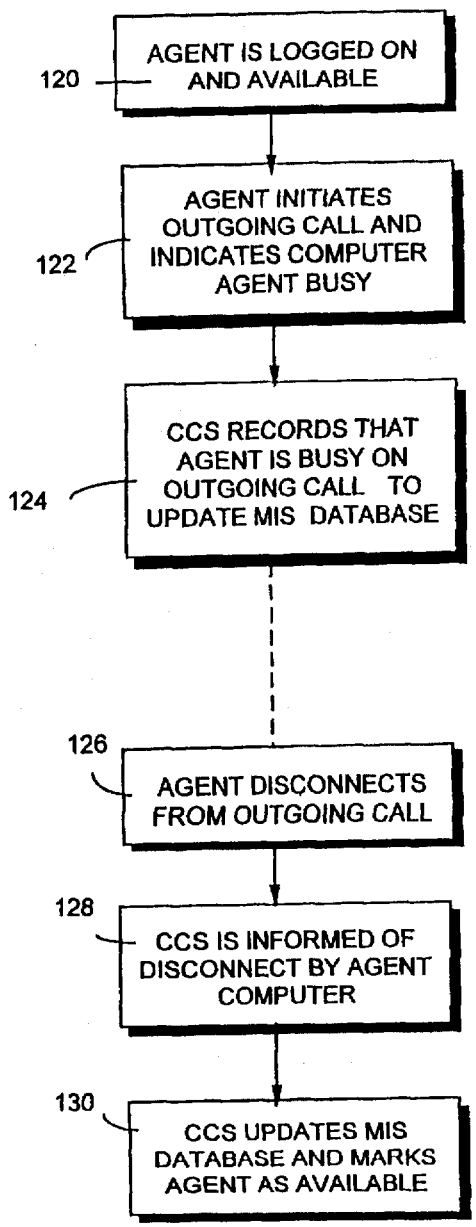

FIG. 4 is a flowchart diagram which illustrates the operations performed when an agent makes an outgoing call without logging off. During this time, the agent is not available for receiving incoming calls. Initially, the agent is logged on and available as shown in block 120. In block 122, the agent initiates an outgoing call and his/her computer indicates that the agent is busy. The CCS 20 records the agent as busy on an outgoing call to update the MIS database (block 124). Sometime later, the agent disconnects from the outgoing call (block 126), and the CCS 20 is informed of the disconnect by the agent's computer (block 128). The CCS 20 updates the MIS section of the database 22 and marks that agent as available (block 130). Many agents have their own telephone numbers by which they may be reached directly on incoming calls. If someone calls the telephone of an idle agent, the call can be accepted and the CCS 20 informed to mark the agent as busy. These features are provided mainly for MIS purposes.

Figure 5:
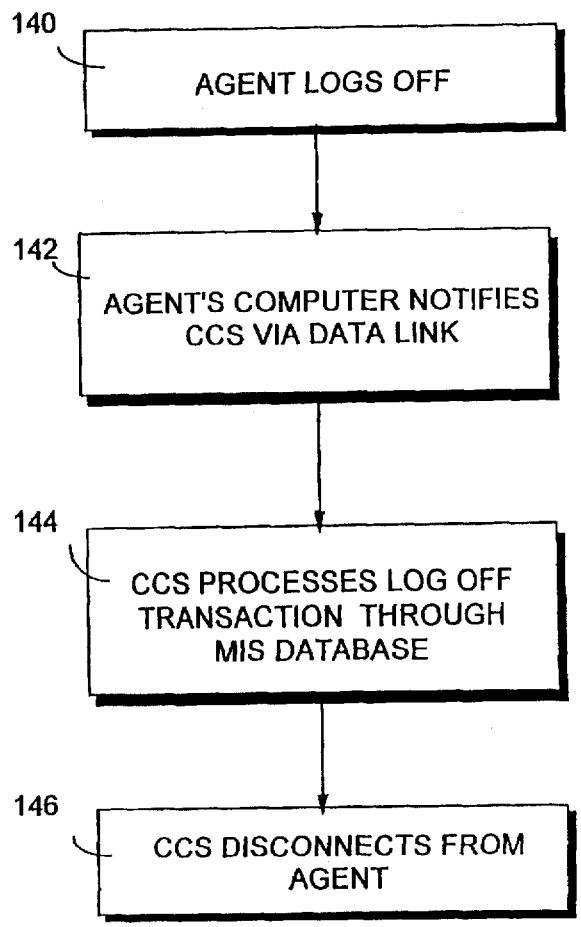

FIG. 5 is a flowchart diagram which illustrates the log-off process. The agent initiates the log-off (block 140), and the agent's computer notifies the CCS 20 via the datalink 26 of the log-off request (block 142). The CCS 20 processes the log-off transaction and records it in the MIS section of database 22 (block 144) and disconnects from the agent (block 146).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An automatic call distribution system, comprising:

a public telephone network including a public telephone switch;

a first set of call receiving agents associated with a first common service entity, each agent having a telephone connected to the public telephone network and a computer terminal;

a controller for initially receiving a call directed to the first common service entity and automatically establishing without using a telephone switch other than the public telephone switch a direct telephone connection between the public telephone switch and the selected agent's telephone for the call between the telephone network and one of the agents, wherein after establishing the telephone connection, the controller is not included in the direct telephone connection; and a data link separate from the public telephone network providing data communications between each of the agent computer terminals and with the controller;

wherein each agent that previously logged-on with the controller indicates availability to handle calls by entering an availability command on the computer terminal and sending the entered availability command over the data link to the controller.

2. The system in claim 1, wherein the controller selects one of the agents to handle the call based on an availability status of the agents.

3. The system in claim 1, wherein the computer terminals of some of the agents are connected over a local area network (LAN) and the LAN is connected to at least one other remotely located agent over a wide area network (WAN).

4. The system in claim 3, wherein each agent's computer terminal includes a corresponding network address and each agent's telephone includes a corresponding telephone number, the controller including a memory for storing the network address and telephone number corresponding to each agent.

5. The system in claim 1, further comprising a second set of call receiving agents associated with a second common service entity, wherein the controller determines to which of the first and second service entities the call is directed and selects an available agent to handle the call from the corresponding first or second set of call receiving agents.

6. The system in claim 1, wherein the controller includes a memory for queuing calls received from the public telephone network until an agent becomes available.

7. The system in claim 1, wherein after receiving the call, the controller sends a call transfer request to the public telephone switch, and in response to the call transfer request from the controller, the public telephone switch transfers the call to the telephone of an available agent to establish a direct telephone connection between the available agent and the public telephone switch.

8. The system in claim 1, wherein for each incoming call received by the controller for the service entity, the controller determines various call handling and agent performance parameters for management of the service entity.

9. The system in claim 1, wherein the controller includes means for generating a voice greeting in response to the call and means for generating voice prompts to which the caller may respond before the call is transferred to a call handling agent.

10. An automatic call distribution system, comprising:

a public telephone network including a public telephone switch;

a first set of call receiving agents associated with a common service entity, each agent having a telephone connected to the public telephone network and a computer terminal;

a controller for initially receiving a call directed to the common service entity and automatically establishing using the public telephone switch a direct telephone connection between the public telephone switch and the selected agent's telephone for the call between the telephone network and one of the agents, wherein after establishing the telephone connection, the controller is not included in the direct telephone connection; and a data link separate from the public telephone network providing data communications between each of the agent computer terminals and with the controller;

wherein each agent that previously logged-on with the controller indicates availability to handle calls by entering an availability command on the computer terminal and sending the entered availability command over the data link to the controller, and wherein the available agent initiates transfer of the call to another of the agents by requesting over the data link a call transfer at the public telephone switch to the telephone number of the another agent.

11. A method for automatically distributing calls to a plurality of call handling agents each having a telephone connected to a public telecommunications network including a public telephone switch and a computer terminal, comprising the steps of:

establishing a data network separate from the public telecommunications network connecting each of the computer terminals thereby permitting data communications between the computer terminals over the data network;

routing a call from a customer to a first common service entity from the public telecommunications network to a call server computer connected to the public telephone switch and to the data network;

after logging in with the call server computer, each logged-in agent indicating availability to handle calls by entering an availability command on the agent's computer terminal and transmitting the entered availability command over the data network to the call server computer;

the call server computer selecting an available, logged-in call handling agent associated with the first common service entity for handling the call in response to the availability command transmitted over the data network;

the call server computer requesting the public telephone switch to route the call to the selected call agent;

in response to the call server computer request, the public telephone switch establishing an independent communications path between the selected call agent and the customer that does not include the call server computer or a telephone switch other than the public telephone switch.

12. The method in claim 11, further comprising:

selecting one of the agents to handle the call based on an availability status of each of the agents.

13. The method in claim 11, wherein some agents are located at a central service facility and other agents are located at remote facilities, the method further comprising:

monitoring a telephone number of each of the agents, and routing calls to agents both at the central service facility and at the remote facilities.

14. The method in claim 11, wherein some of the call handling agents are associated with a second common service entity, the method further comprising:

(a) determining to which of the first and second service entities the call is directed, and (b) selecting an available agent corresponding to the service entity determined in step (a) to handle the call.

15. The method in claim 11, wherein some agents are located at a central service facility and other agents are located at remote facilities, the method further comprising:

connecting the computer terminals of agents at the central service facility and agents at remote facilities over a wide area network that is independent of the public telecommunications network, and transmitting data messages between the computer terminals and the call server over the wide area network.

16. The method in claim 14, wherein the first and second service entities provide services for different businesses.

* * * * *